US007831898B2

(12) United States Patent
Wecker et al.

(10) Patent No.: US 7,831,898 B2
(45) Date of Patent: Nov. 9, 2010

(54) CONTENT REPLACEMENT IN ELECTRONICALLY-PROVIDED ARCHIVED MATERIAL

(75) Inventors: David Brian Wecker, Redmond, WA (US); Michael S. Cooper, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 376 days.

(21) Appl. No.: 11/693,228

(22) Filed: Mar. 29, 2007

(65) Prior Publication Data

US 2007/0174364 A1    Jul. 26, 2007

Related U.S. Application Data

(63) Continuation of application No. 10/091,276, filed on Mar. 5, 2002, now abandoned.

(51) Int. Cl.
*G06N 3/00* (2006.01)
(52) U.S. Cl. .......................... 715/200; 715/234
(58) Field of Classification Search ................ 715/234, 715/243, 254, 255, 200
See application file for complete search history.

(56) References Cited

U.S. PATENT DOCUMENTS

| | | | |
|---|---|---|---|
| 5,618,232 A | 4/1997 | Martin, Jr. ................. 463/25 |
| 5,715,403 A | 2/1998 | Stefik ........................ 395/244 |
| 5,845,281 A | 12/1998 | Benson et al. ................. 707/9 |
| 6,023,708 A | 2/2000 | Mendez et al. ............. 707/203 |
| 6,285,999 B1 | 9/2001 | Page ............................ 707/5 |
| 6,487,538 B1 * | 11/2002 | Gupta et al. ............ 705/14.66 |
| 6,701,315 B1 | 3/2004 | Austin ........................ 707/10 |
| 6,704,797 B1 | 3/2004 | Fields et al. ................ 709/246 |
| 6,898,571 B1 | 5/2005 | Val et al. ..................... 705/14 |
| 7,068,724 B1 * | 6/2006 | Hamilton ............... 375/240.26 |
| 2002/0035697 A1 * | 3/2002 | McCurdy et al. ............ 713/200 |
| 2002/0196275 A1 * | 12/2002 | Willner et al. ............. 345/744 |
| 2004/0243470 A1 * | 12/2004 | Ozer et al. .................... 705/14 |

OTHER PUBLICATIONS

Deng, J., et al., "Local web advertisement through dynamic active proxy," *IEEE International Conference on Multimedia and Expo.*, Jul. 30-Aug. 2, 2000, ISBN: 0 7803 6536 4, vol. 2, 1183-1186.

Mazur, L., "When next for the banner ad?," *Internet Business Magazine Ltd.*, Jul. 2000, ISSN. 1366-2821, 78-83.

Raghu, S., "Dynamic profiling of consumers for customized offerings over the Internet: a model and anyalysis," *J. Decision Support Systems*, 2001, ISSN: 0167-9236, 32, 117-134.

* cited by examiner

*Primary Examiner*—Kyle R Stork
(74) *Attorney, Agent, or Firm*—Woodcock Washburn LLP (57) ABSTRACT

A document, publication or a portion of a publication containing collateral information (e.g. advertisements) is delivered in electronic form, preferably appearing electronically as it appears in traditional printed form. Collateral information associated with the document, publication or portion of the publication is dynamically replaced, enabling the user to potentially receive more useful and relevant information and enabling the publisher to potentially generate new revenue from the replaced collateral information.

20 Claims, 5 Drawing Sheets

CONTENT REPLACEMENT IN ELECTRONICALLY-PROVIDED ARCHIVED MATERIAL

CROSS-REFERENCE TO RELATED APPLICATIONS

This application is a continuation of patent application Ser. No. 10/091,276, filed Mar. 5, 2002, the entire disclosure of which is hereby incorporated by reference in its entirety.

FIELD OF THE INVENTION

The present invention relates generally to the field of computing. More particularly, the invention relates to a system and method for rendering, on demand, archived material electronically while replacing some original substitutable content in the delivered material.

BACKGROUND

As publishing costs and postage rates soar, publishers of archived material such as printed periodicals are searching for innovative ways to increase their bottom line. For example, many periodicals routinely publish electronic versions of current issues on a web site, in addition to traditional printed versions. Typically, however, such electronically available versions have failed to generate the hoped-for revenues. In fact, typically web site-published periodicals do not generate the gross revenue that their printed counterparts do. Many believe that the reason for these disappointing results has to do with the look and feel of the web product. Many believe that readers prefer the look and feel of the traditional printed product. Publishers thus have recently become interested in providing electronic copies of their publications in a form visually similar to that of the printed product.

In addition to the publication of current issues of periodicals, it is widely believed that a largely untapped market for archived material (e.g., back issues of periodicals) exists. For example, perhaps a reader would like to read an article published in the January 2000 edition of the magazine Today's Equine. Publishers typically make back issues of their printed publications available for sale to subscribers on a limited basis, so the reader could contact the publisher of Today's Equine and request to purchase the January 2000 issue. If a January 2000 issue of Today's Equine is available, the reader may be able to acquire the back issue. Such activity is not likely to generate large amounts of revenue for the publisher, because of associated costs of producing and delivering a printed publication and because no new advertising revenue is associated therewith. Additionally, the relevant information (e.g., the magazine article of interest to the reader) is typically accompanied by collateral information (e.g., one or more advertisements) that are no longer relevant. For example, perhaps the article of interest to the reader is an article on horses. The article on horses may be accompanied by at least one advertisement for a sale on horse feed, but, for example, (depending on how old the article is) the sale may be over, or that particular brand of horse feed may not be available in the geographic location of the requester.

Perhaps the article as published in the January 2000 Today's Equine is available electronically. Since typically 60-70% of the cost of producing a typical magazine is paid for by advertising, it would seem logical to exploit this potential "new" source of revenue by providing the January 2000 issue electronically, perhaps as it appeared in printed form, but with a current advertisement or with an advertisement targeted to the requester, providing the opportunity both to receive new revenue from an advertiser and to expand the delivery of back issues of publications or other archived material to readers. Moreover, it may be desirable to retain the look of the printed document, while replacing old collateral information (e.g., advertisements) with new information, for which the collateral information provider (e.g., advertiser) could be charged a new fee. To date, however, no mechanism to do this is known.

SUMMARY OF THE INVENTION

Archived material, such as but not limited to, television programming, a document, publication or a portion of a publication or publications containing collateral information (e.g. advertisements) is delivered to a requester in electronic form, optionally appearing electronically as it appears in traditional printed form. Collateral information associated with the archived material is dynamically replaced, enabling the requester to potentially receive more useful or more relevant information and enabling the publisher to potentially generate new revenue from replacing the collateral information as well as from the requestor for receiving the information.

Meta-data describes features of archived material including features of components of a document and may be explicit, implicit or inferable. Meta-data may exist as a separate entity or may be embedded within the data stream itself. In one embodiment, original documents are stored in a document store, meta-data is stored in a meta-data store, collateral content is stored in a collateral content store and rules for replacement of content is stored in a rules store. In another embodiment a tree data structure is used as a basis to generate the archived material, including the replaceable or substitutable part of the content.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Exemplary Computing Environment

Figure 1:
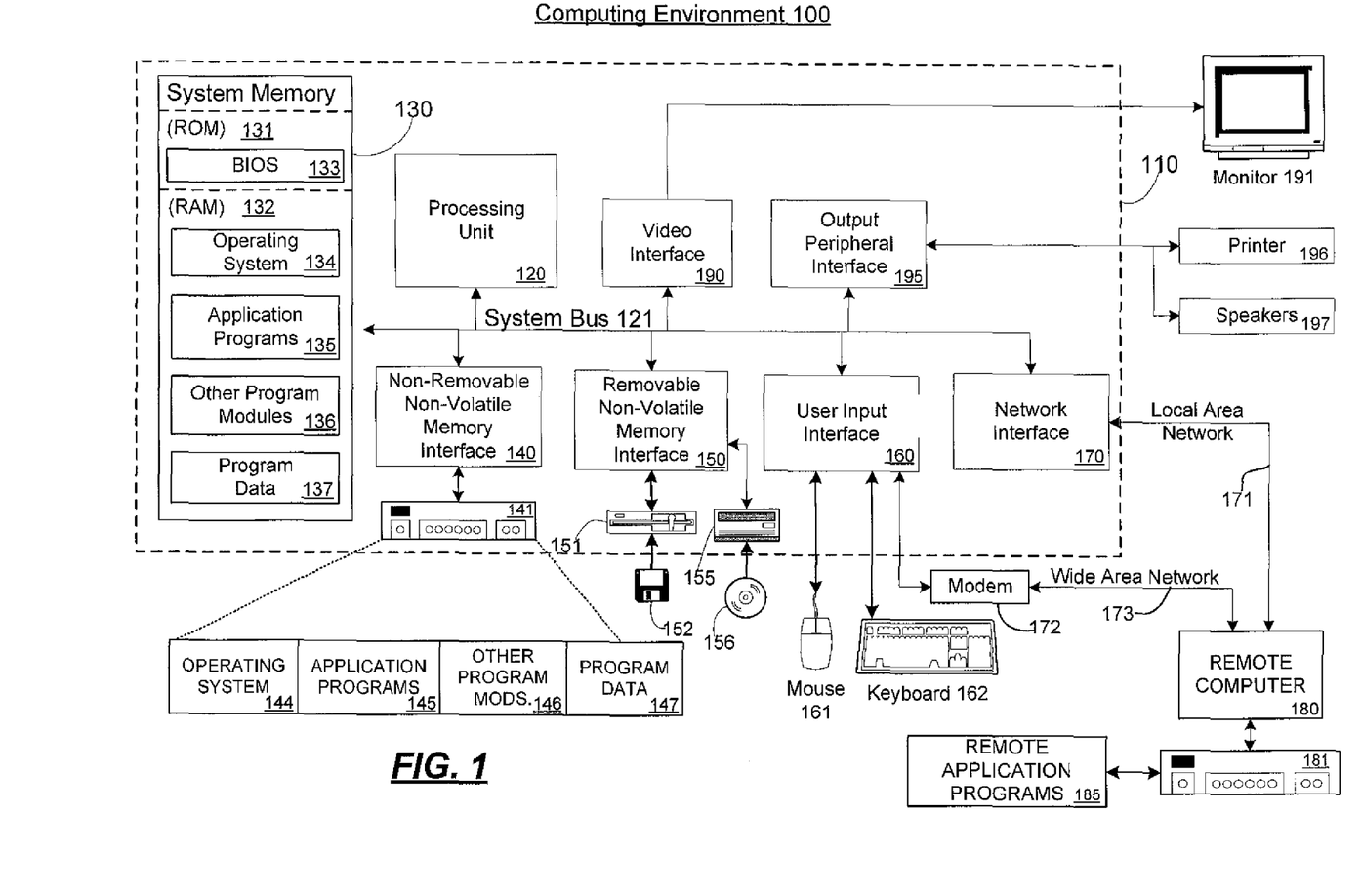
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available medium that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Content Replacement in an Electronic Document

Figure 2:
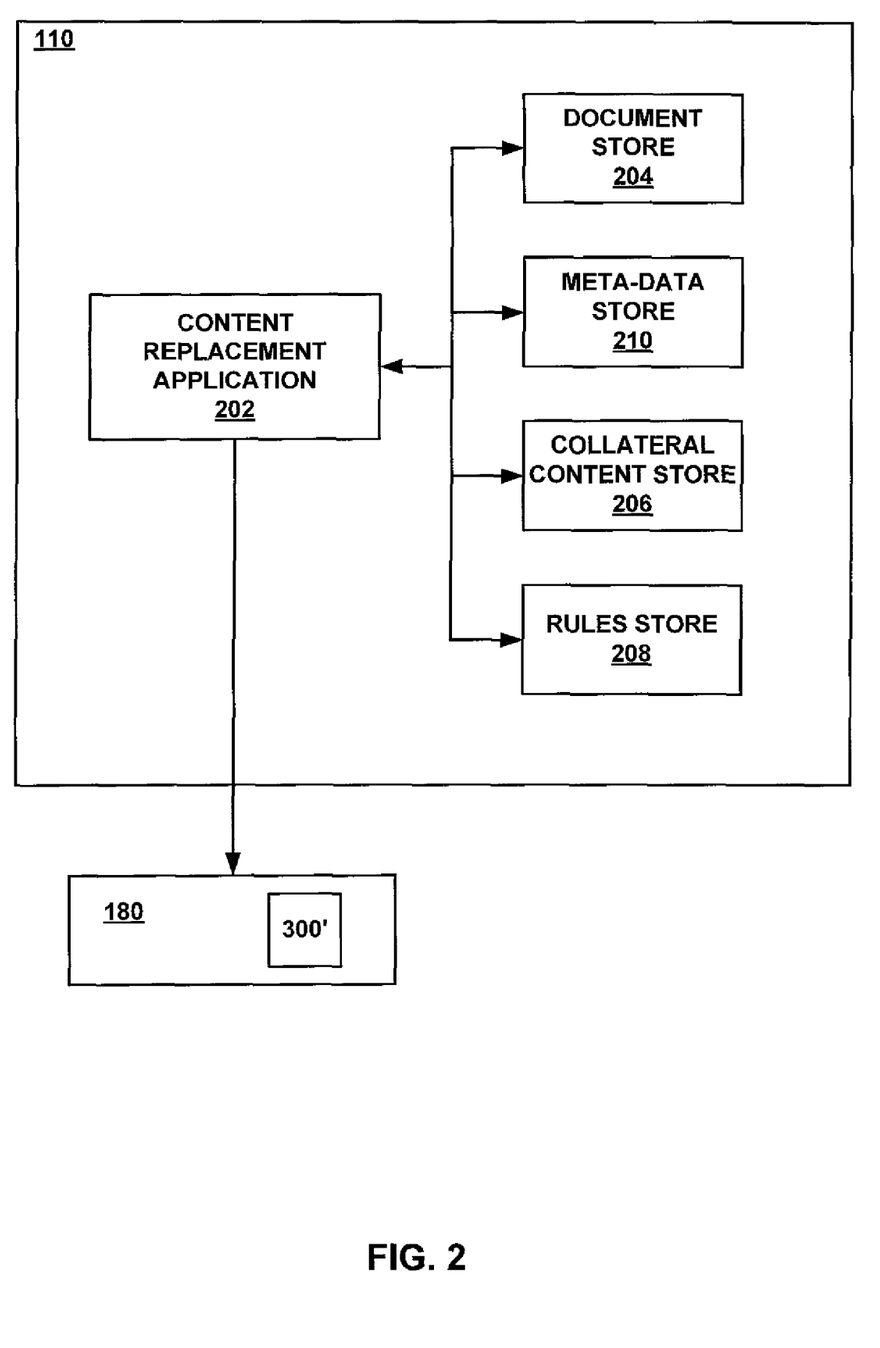
FIG. 2 is a block diagram of a software application that executes in the computing environment of FIG. 1, and that displays documents electronically, replacing portions of the display with updated content.

FIG. 2 illustrates an exemplary system for generating archived material, (e.g., an electronic document), replacing substitutable content associated with the archived material with updated, more current or more relevant content. Archived content is contemplated to include television programming, publications and any other archived material suitable for electronic rendering. Optionally in the case of printed material, the document or documents is/are displayed in substantially the identical form as the printed publication(s) from which the document(s) is/are derived. In one embodiment of the invention, computer 110 is communicatively coupled to a remote computer 180. Computer 110 in this embodiment of the invention is a server from which the electronic document 300' may be downloaded to client 180.

Computer 110 stores an application 202 that generates an electronic document for display on computing device 180. Application 202 in one embodiment retrieves a document from a document store 204, and replaces substitutable content with updated, more relevant or requestor-targeted content according to at least one of a plurality of rules. Meta-data store 210, in one embodiment of the invention, stores meta-data. Meta-data describes the features of a document and the features of items of the document, such as text, image(s) and collateral content. Collateral content store 206, in one embodiment of the invention, stores collateral content, such as, for example, advertisements. Rules store 208 stores rules that are used to select content to replace a pre-existing item(s). The document may be delivered to another computing device 180. In another embodiment of the invention, a tree structure is utilized to generate the document or other archived material including the updated content. In still another embodiment of the invention, one or more components of application 202, such as, for example, collateral content store 206 may be resident on client 180.

Figure 3:
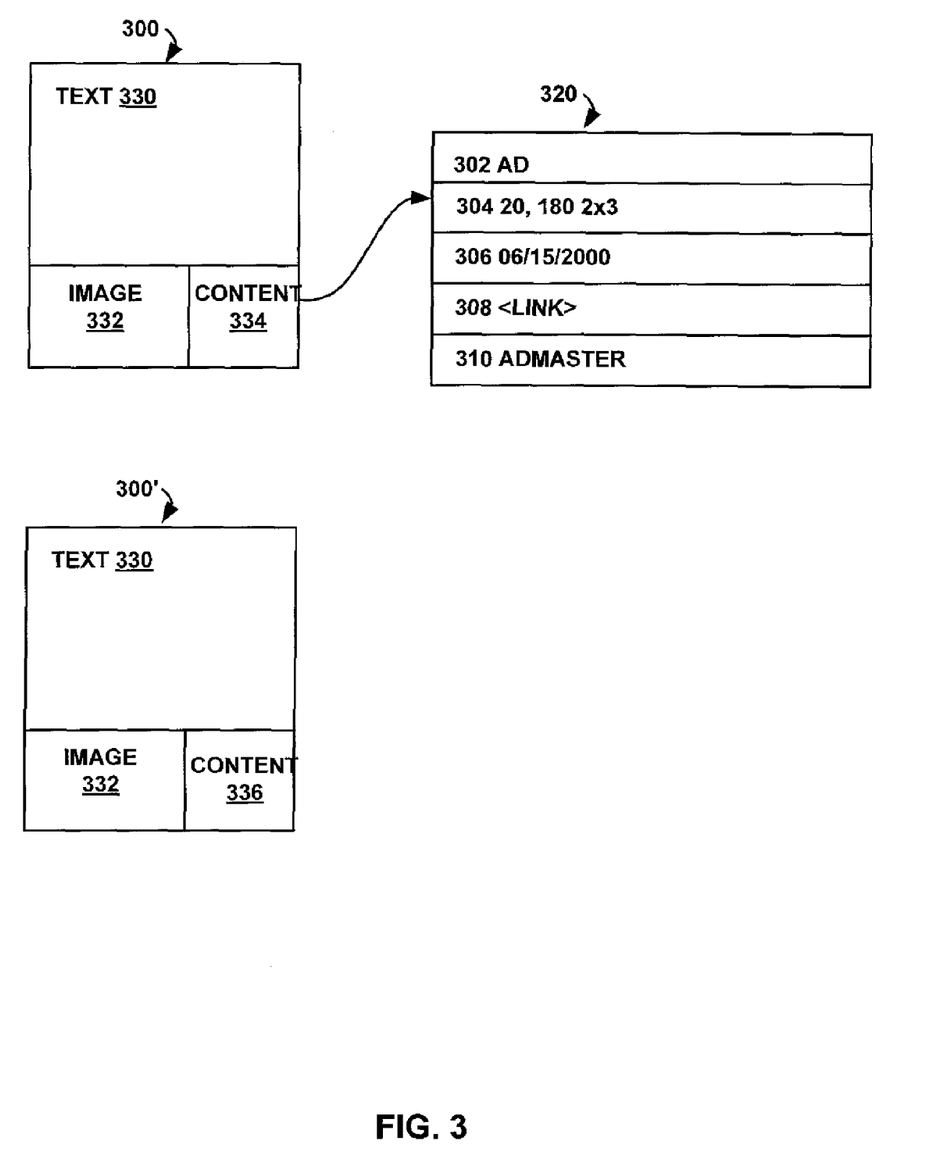
FIG. 3 is a block diagram of an exemplary data structure for displaying a document electronically, where portions of the display are replaced with updated content.

In one embodiment of the present invention, document store 204 includes a version of the document 300, as displayed in FIG. 3. Document 300 may comprise an entire issue of a publication, an article of a publication, a page of a publication or any other suitable portion or combination of issues of publications. Publications as used herein are contemplated as including newspapers, newsletters, magazines or any publication suitable for reproducing electronically.

Document 300 may include text 330, an image 332, and collateral content 334. Document 300 may include additional pages, additional text (not shown), additional images (not shown) and/or additional collateral content (not shown). For example, a document may include more than one piece of text (i.e., an article accompanied by a side-bar) and/or more than one photograph or image, and so on. The page on which the document appears in the printed publication from which document 300 derived may include additional items not associated with document 300 such as but not limited to, portions of another document.

Document 300 preferably is associated with meta-data, which in one embodiment is stored in data store 210. Text, images and collateral content items are also each associated with meta-data. Exemplary meta-data illustrated in FIG. 3 is associated with collateral content item 324 but it should be understood that meta-data for document 300, text 330, etc. also preferably exist in meta-data store 210 in this embodiment. Meta-data describes features of the archived material and may be explicit in nature or may be inferred or embedded within the data itself.

Meta-data preferably includes but is not limited to:

category 302 of the item, for example, may indicates that the item is text (e.g., an article), collateral content (e.g., an advertisement), or a picture or image;

geometric data 304, for example, may indicate the page on which the item occurs in the printed publication, the size of the item and/or the position of the item on the page;

temporal relevancy 306, for example, may indicate a time period after which the item would be considered outdated or alternatively, (e.g., the latest date that the item should be displayed), or alternatively, a time period until which the item would be considered current (e.g., a date until which an item could be displayed);

links to related information 308, wherein the related information may be in the same document or not within the same document. Related information may include alternate versions, that is, the same document displayed with different collateral information. Related information may also include printable coupons associated with the article topic, the collateral content, and/or requester preferences and the like;

business information 310, such as but not limited to owner, sponsor, cost basis; and other suitable information.

Collateral content store 206 preferably includes a plurality of collateral content items that collectively comprise a universe of possible collateral content items with which to replace collateral content items that are outdated when a document is retrieved. Preferably, collateral content store 206 includes current collateral content items, such as advertisements that are current when the document is requested and which may be used, for example, to replace original collateral content item 334. In one embodiment of the invention, collateral content store 206 is a separate store of replaceable items (e.g., advertisements with meta-data). In an alternative embodiment collateral content store 206 includes current items, original items and substitutable items. Original items, for example, are contemplated to include content originally associated with the archived material. Current items include collateral content that is currently relevant and substitutable content represent information that may be replaced with more current, more relevant, requestor-targeted content or the like. Collateral content store 206 preferably changes over time—e.g., by replacing out-of-date advertisements with new ones. Items in collateral store 206 are associated with meta-data stored in data store 210, which preferably include the size of the item and a date beyond which the content item is outdated or substitutable. Rules from rules store 208 preferably are consulted to determine which collateral content item from collateral content store 206 should be used to replace collateral item 334.

Rules store 208 preferably includes rules for replacing separable items of document 300 with new items (e.g., rules for determining which collateral item(s) of collateral content store with which to replace the collateral content item of the original document to create a new document or other instance of an archived material). Hence, for example, rules store 208 preferably includes logic for selecting an appropriate item (or more than one appropriate items) from collateral content store 206 to display in new document 300' as item 336.

Figure 4:
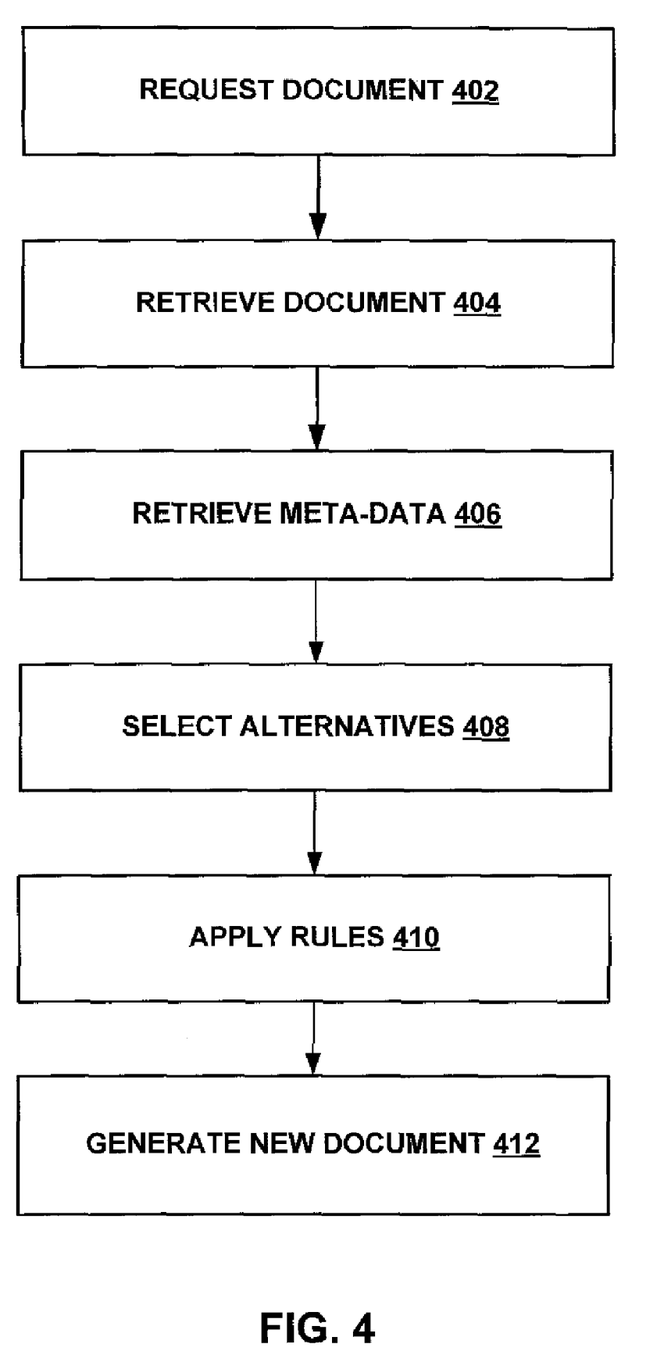
FIG. 4 is a flow diagram of an exemplary method for replacing collateral information associated with a document in an electronically provided document.

FIG. 4 shows a method of providing an instance of an archived material (e.g., a document) with new collateral information. At step 402 a document 300 is requested. Document 300 may be a publication, such as a newspaper or magazine, or an article or page within a publication, newspaper or magazine. For example, assume the article beginning on page 20 of the January 2000 issue of Today's Equine "Horses in America" is requested. It will be understood that there are many well-known ways in which a particular document or other instance of archived material may be requested, including but not restricted to queries based on: publication name, date and page number; publication and author's name; date and article name; topic; and various other ways, all of which are contemplated by the invention.

At step 404, document 300 is retrieved from document store 204. At step 406, meta-data associated with document 300 is retrieved from meta-data store 210. For example, document 300 may include text 330, (an article about horses), image 332, (a picture of a famous horse), and collateral content item 334, (a two inch by three inch advertisement for a sale on a particular brand of horse feed). Assume further that the date of the document request is Jan. 15, 2001 and that the meta-data 320 associated with collateral content item 334 indicates that collateral content item 334 "expires" Jun. 15, 2000. Hence, collateral content item 334 is substitutable (in this case, because the content is outdated).

At step 408 one or more suitable collateral content items is retrieved from the collateral content store 206. For example, a suitable collateral content item preferably is approximately the size of the original collateral content item or can be scaled to that size and is related to the subject of the document and is current.

At step 410 rules from rules store 208 are applied to the one or more collateral content items selected in step 406, and one of these items is selected to replace content item 334. In the example illustrated in FIG. 3, collateral content item 336 is selected to replace collateral content item 334.

The following is an example of the types of rules contained in rules store 208:

1. Only one collateral item of same topic can be placed on a single page, (e.g., if document topic is computers, put only one computer manufacturer advertisement per page.)

2. A collateral item selected to replace an original collateral is based on region or demographics (e.g., if the document request for the article on horses originated in Pennsylvania, replace the substitutable advertisement of horse feed not available in Pennsylvania with a current advertisement of a horse feed available in Pennsylvania.)

3. Tie the collateral content used to replace substitutable content to consumer-related preferences. For example, if a consumer explicitly (by specifically indicating) or implicitly (by previous selections) expresses an interest in a particular topic, preferentially display content relating to that interest.

At step 412 a new document 300' is generated with collateral content item 336 displayed in the area previously occupied by item 334 in original document 300. Optionally, the archived material rendered, original and replacing content, information associated with the requestor and the like may be tracked, logged and/or stored for use in billing and other suitable purposes.

Figure 5:
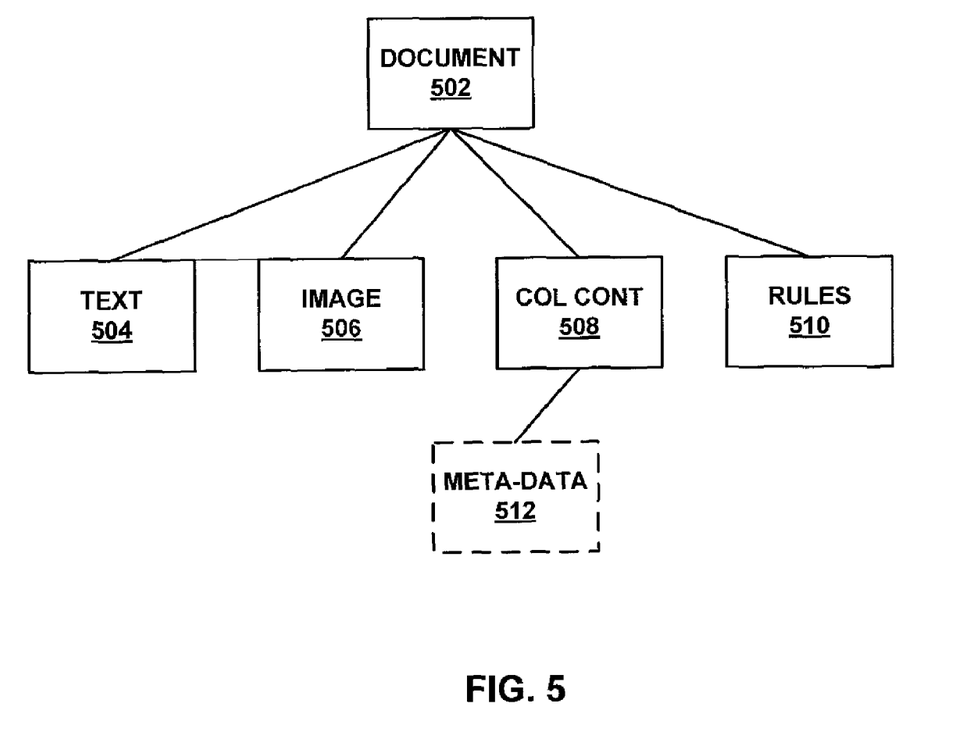
FIG. 5 is a block diagram of an exemplary tree data structure for displaying a document electronically, where portions of the display are replaced.

FIG. 5 illustrates a tree data structure employed in an alternative embodiment of the invention. In this embodiment, the nested structure of archived material is represented by a tree. For example, each item (and sub-item) of a document is represented by a node in the tree, and the meta-data for each item is stored in the item's node. For example, root node 502 represents document 300. Child node 504 represents text 330, child node 506 represents image 332, child node 508 represents collateral content item 334, child node 510 represents rules associated with document 300. Additional images, and collateral content items associated with document 300 are represented as additional child nodes (not shown) descending from root node 502. Meta-data associated with document 300 in one embodiment is included in the node to which the meta-data relates. However, the meta-data may be represented in the tree data structure in any manner—e.g., putting the meta-data for an item in the item's left-most child node (512)—so long as any program that needs to traverse the tree can find the meta-data in a well-defined location.

The tree data structure described above is advantageous because, in this embodiment, an intermediate tree structured database is created and stored when a document is requested (step 402) including design-intent information enabling automatic layout of the final document when the document is served.

The programming necessary to effectuate the processes described above in connection with the present invention is relatively straight-forward and should be apparent to the relevant programming public. Any particular programming language or methodologies may be employed to effectuate the present invention without departing from the spirit and scope thereof.

In the foregoing description, it can be seen that the present invention comprises a new and useful mechanism as described above. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A method for providing archived material comprising:
 receiving a query for the archived material from a requester, the archived material comprising material suitable for reproducing electronically stored in a data store, wherein the requester is associated with a set of characteristics;
 in response to receiving the query:
 retrieving a first instance of the archived material, the first instance of archived material satisfying the query, the first instance of archived material comprising a plurality of items including a non-substitutable item satisfying the query and at least one collateral item comprising a substitutable item, wherein the quantity of collateral items in the archived material can change over time;

retrieving metadata relating to the at least one collateral item, wherein the metadata indicates a temporal relevancy of the at least one collateral item;

identifying the at least one collateral item to be collateral based on its temporal relevancy to a date of the query;

determining a replacement for the substitutable item by referring to a set of rules comprising at least one rule associated with the substitutable item or at least one rule associated with the archived material or at least one rule associated with the set of characteristics, wherein the set of rules determine at least one allowable replacement of an original collateral item by a replacement collateral item;

selecting a second collateral item according to the set of rules;

generating a second instance of the archived material comprising the non-substitutable item and the second collateral item, wherein the second collateral item replaces the substitutable item of the first instance; and providing the second instance of the archived material to the requester.

2. The method of claim 1, further comprising charging a fee for providing the second instance.

3. The method of claim 1, further comprising charging a fee for replacing the substitutable information with the second collateral item in the second instance of the archived material.

4. The method of claim 1, wherein the first instance of the archived material is retrieved from a data store resident on a first computing device, and wherein the method further comprises transmitting the second instance of the archived material to a second computing device communicatively coupled to the first computing device.

5. The method of claim 1, wherein the substitutable item comprises an advertisement and the second collateral item comprises requestor-targeted content.

6. The method of claim 1, wherein the archived material comprises television programming, a document, a publication, a portion of a publication or a plurality of publications.

7. The method of claim 1, wherein the archived material comprises links to related information.

8. The method of claim 7, wherein the related information comprises alternate versions of a document displayed with different substitutable information, printable coupons associated with a topic of the archived material or with requester preferences.

9. The method of claim 1, wherein the second collateral item is substituted for the substitutable item before the second instance of the archived material is provided to the requester.

10. A system for rendering archived material comprising:
a data store which stores plurality of instances of archived material; and
a processor, wherein the processor is adapted to:
upon receiving a query from a requester having a set of characteristics;
retrieve a selected first instance of the archived material, the selected first instance of archived material satisfying the query, the selected first instance of archived material comprising a plurality of items including a non-substitutable item satisfying the query and at least one collateral item comprising a substitutable item, wherein the quantity of collateral items in the archived material can change over time;

retrieve metadata relating to the at least one collateral item, wherein the metadata indicates a temporal relevancy of the at least one collateral item;

identifying the at least one collateral item to be collateral based on its temporal relevancy to a date of the query;

determining a replacement for the substitutable item by referring to a set of rules comprising at least one rule associated with the substitutable item or at least one rule associated with the archived material or at least one rule associated with the set of characteristics, wherein the set of rules determine at least one allowable replacement of an original collateral item by a replacement collateral item;

selecting a second collateral item according to the set of rules and the metadata;

generating a second instance of the archived material comprising the non-substitutable item and the second collateral item, wherein the second collateral item replaces the substitutable item of the first instance; and providing the second instance of the archived material to the requester.

11. The system of claim 10, wherein the substitutable item comprises a first advertisement and wherein the second item comprises a targeted advertisement.

12. The system of claim 11, wherein the first advertisement is determined to be substitutable by comparing a date on which the query is received with an expiration date associated with the first advertisement, wherein the date on which the query is received is later than the expiration date.

13. The system of claim 10, wherein the data store of instances of archived material is resident on a first computing device and wherein the system further comprises a module which transmits the second instance to a second computing device communicatively coupled to the first computing device via a communications network.

14. The system of claim 10, further comprising charging a fee for providing the second instance.

15. The system of claim 10, further comprising charging a fee for replacing the substitutable item.

16. A computer storage medium comprising computer-executable instructions that when executed by a computing environment:
in response to receiving a query from a requester associated with a set of characteristics:
retrieve a first instance of archived material, the first instance of archived material comprising a plurality of items including a non-substitutable item satisfying the query and at least one collateral item comprising a substitutable item, wherein the quantity of collateral items in the archived material can change over time;

retrieve metadata relating to the at least one collateral item, wherein the metadata indicates a temporal relevancy of the at least one collateral item;

identifying the at least one collateral item to be collateral based on its temporal relevancy to a date of the query;

determine a replacement for the substitutable item by referring to a set of rules comprising at least one rule associated with the substitutable item or at least one rule associated with the archived material or at least one rule associated with the set of characteristics, wherein the set of rules determine at least one allowable replacement of an original collateral item by a replacement collateral item;

select a second collateral item according to the set of rules;

generate a second instance of the archived material comprising the non-substitutable item and the second collateral item, wherein the substitutable item of the first instance is replaced by the second collateral item before returning the second instance; and provide the second instance to the requester.

17. The computer storage medium of claim 16, comprising further computer-executable instructions that when executed by the computing environment:

charge a fee for providing the second instance.

18. The computer storage medium of claim 16, comprising further computer-executable instructions that when executed by the computing environment:

charge a fee for replacing the substitutable information with the second collateral item in the second instance.

19. The computer storage medium of claim 16, comprising further computer-executable instructions that when executed by the computing environment:

replace the substitutable item comprising an advertisement of the first instance with a second collateral item comprising a targeted advertisement in the second instance.

20. The computer-readable storage medium of claim 16, comprising further computer-executable instructions that when executed by the computing environment:

retrieve a first instance of archived material, wherein the archived material comprises television programming, a document, a publication, a portion of a publication or a plurality of publications.

\* \* \* \* \*